(12) United States Patent
Pettit

(10) Patent No.: US 8,725,773 B2
(45) Date of Patent: May 13, 2014

(54) SYSTEM AND METHOD FOR GENERATING A KNOWLEDGE METRIC USING QUALITATIVE INTERNET DATA

(75) Inventor: Frances Annie Pettit, Toronto (CA)

(73) Assignee: e-Rewards, Inc., Plano, TX (US)

(*) Notice: Subject to any disclaimer, the term of this patent is extended or adjusted under 35 U.S.C. 154(b) by 0 days.

(21) Appl. No.: 13/598,921

(22) Filed: Aug. 30, 2012

(65) Prior Publication Data
US 2013/0054559 A1    Feb. 28, 2013

Related U.S. Application Data

(60) Provisional application No. 61/528,862, filed on Aug. 30, 2011.

(51) Int. Cl.
*G06F 17/30*    (2006.01)
(52) U.S. Cl.
CPC ....................................... *G06F 17/30* (2013.01)
USPC ............ 707/791; 707/802; 707/822; 707/828
(58) Field of Classification Search
CPC ...................................................... G06F 17/30
USPC ................................................. 707/800–899
See application file for complete search history.

(56) References Cited

U.S. PATENT DOCUMENTS

| | | | |
|---|---|---|---|
| 7,698,422 B2 | 4/2010 | Vanderhook et al. | |
| 7,792,841 B2 | 9/2010 | McAllister et al. | |
| 7,796,056 B2 | 9/2010 | Fein et al. | |
| 7,877,345 B2 | 1/2011 | Nigam et al. | |
| 7,966,337 B2 | 6/2011 | Blackman et al. | |
| 2007/0203790 A1* | 8/2007 | Torrens et al. | 705/14 |
| 2010/0145940 A1 | 6/2010 | Chen et al. | |
| 2011/0004483 A1 | 1/2011 | Ting et al. | |
| 2011/0179009 A1 | 7/2011 | Nam | |

OTHER PUBLICATIONS

Pak, Alexander, et al., "Twitter as a Corpus for Sentiment Analysis and Opinion Mining", Retrieved from Internet on Oct. 15, 2012; pp. 1320-1326.
International Search Report and Written Opinion issued for PCT/US2012/053121, dated Dec. 21, 2012, 9 pages.

* cited by examiner

*Primary Examiner* — Isaac M Woo
(74) *Attorney, Agent, or Firm* — Fulbright & Jaworski LLP

(57) ABSTRACT

An online marketing research measurement that allows a user to derive and/or monitor knowledge metrics, such as awareness metrics, recommendation metrics, advocacy metrics, etc. about a target subject, such as the user's brands and/or products using existing data on the Internet. Rather than requiring responses solicited from active participants in a survey (as in traditional surveys), unsolicited opinion data residing on the Internet can be gathered and processed for deriving various types of knowledge metrics. A recommendation metric can be derived from opinion data gathered from the Internet, which reflects a measure of recommendation opinions about the target subject. Users may identify the specific brand in which they are interested. After an Internet crawler is sent out to select data, the engine cleans the results of poor quality data, codes the data according to the appropriate constructs or variables, and then scores the sentiment using the system's sentiment engine.

10 Claims, 10 Drawing Sheets

1101 — Data is sampled and weighted to meet specific measurement needs before delivered in portal and data format.

|   | A | B |
|---|---|---|
| 1 | Id | name |
| 2 | 1 | Pricing |

|   | A | B | C | D | E | F |
|---|---|---|---|---|---|---|
| 1 | Id | definition | | | | |
| 2 | 1 | 5 | 2 | 3.42 | 3 | |
| 3 | 2 | 862321 | 5 | 2 | 3.42 | 3 |
| 4 | 3 | | | | | |
| 5 | 4 | | | | | |

|   | A | B | C | D | E |
|---|---|---|---|---|---|
| 1 | Id | title | | | |
| 2 | 1 | FM HD Rad | verbatim | 5 | 2 | 3.42 | 3 | 1 | 0 | 0 | 0 |

|   | A | B | C | D | E | F | G | H | I | J |
|---|---|---|---|---|---|---|---|---|---|---|
| 1 | Id | date | source | source_type | score | box | construct_1 | construct_2 | construct_3 | construct_4 |
| 2 | 840902189 | 6/17/2010 | 5 | 2 | 3.42 | 3 | 1 | 0 | 1 | 0 |
| 3 | 862321242 | 5/17/2010 | 5 | 2 | 3 | 3 | 0 | 0 | 0 | 0 |
| 4 | 868866786 | 8/22/2010 | 6 | 3 | 3.1 | 3 | 1 | 0 | 0 | 0 |
| 5 | 983089378 | 5/6/2010 | 3 | 2 | 3.217 | 3 | 0 | 0 | 1 | 0 |
| 6 | 983392226 | 5/7/2010 | 5 | 2 | 3.6 | 3 | 0 | 0 | 0 | 0 |
| 7 | 987007784 | 5/13/2010 | 6 | 3 | 3.145 | 3 | 0 | 0 | 0 | 0 |

*FIG. 11*

SYSTEM AND METHOD FOR GENERATING A KNOWLEDGE METRIC USING QUALITATIVE INTERNET DATA

CROSS-REFERENCE TO RELATED APPLICATIONS

This application claims priority to U.S. Provisional Patent Application No. 61/528,862, filed Aug. 30, 2011 and entitled, "SYSTEM AND METHOD FOR GENERATING A KNOWLEDGE METRIC USING QUALITATIVE INTERNET DATA," the disclosure of which is incorporated herein by reference.

TECHNICAL FIELD

The following description relates generally to gathering data from the Internet and generating survey result information about a subject, and more particularly to systems and methods for generating a knowledge metric about a subject using qualitative Internet data, such as unsolicited opinion data gathered from the Internet. Various types of knowledge metrics may be generated or derived using unsolicited data gathered from the Internet, such as awareness metric (e.g., indicating how aware the population from which data is gathered is of a given subject, such as a given brand or product), a recommendation metric (e.g., indicating whether the population from which data is gathered would recommend the subject to others), an advocacy metric, a connection metric, etc.

BACKGROUND

Surveys are important tools for gaining information about a subject from a target audience. By surveying a target audience one may learn preferences, viewpoints, opinions, likes and/or dislikes, and/or other information regarding various subjects, such as products, services, brands, political candidates, etc. Traditionally, surveys have been conducted through active solicitation of information from participants. That is, members of a target audience have traditionally been invited to participate in a survey in which the participants are presented questions in order to actively solicit their responses, thereby providing information about their respective viewpoints, opinions, etc. about a given subject, such as a particular product, service, brand, etc.

Traditionally, for a given survey, the target audience to be invited to participate in the survey may be selected randomly or based on certain characteristics they possess, such as their demographics (age, geographic location, family status, etc.), interests, their use or familiarity with a given subject (e.g., certain products, services, etc.), and/or other characteristics. The members of a target audience who participate in a given survey may be referred to generally as "panelists." In some instances, incentives or rewards are offered to target audience members to encourage their participation in traditional surveys. Traditional surveys generally present questions to members of the target audience (or "panelists") to actively solicit their responses, and the members' responses are recorded for analysis. The members may be logically grouped in various ways, such as based on certain characteristics of the members like gender, age, education level, geographic location, etc. Thus, surveys may enable insight to be gained by market researchers regarding the views/opinions of the various members of a target audience about a subject.

Various mechanisms have been used for interacting with panelists for conducting traditional surveys. One approach is telephone-based surveys, where a human operator or interactive voice response ("IVR") system may interact with the panelist to conduct the survey. The panelist's responses are typically recorded to a computer-readable data storage medium for later analysis.

Another approach for conducting surveys has been through online web-based surveys (or "online panels"). In general, panels are an approach to sampling and maintaining contact lists for research by any channel, and such panels have evolved to be implemented online via web-based surveys. When conducting a web-based survey, panelists access and conduct a survey via the Internet, such as through a particular website. A web server hosts a website that presents a user interface to each panelist's web browser that accesses the website. In some implementations, a survey engine resides on a web server (e.g., within a web page) presents an appropriate user interface for interacting with the respondent (e.g., presenting questions and receiving input from the respondent for answering the questions). Thus, in a traditional web-based survey, each panelist interacts with a user interface via their Internet connection with the hosting web server to input responses to the questions, and those responses are recorded to a computer-readable data storage medium for later analysis.

From the collected survey information, various types of market research metrics may be derived reflecting the knowledge (e.g., awareness, opinions, etc.) of the survey participants about the subject of the survey (e.g., a given brand, product, etc.). For instance, one type of survey information that is often collected in a survey is information regarding whether the survey participant would recommend the subject of the survey (e.g., a particular brand, product, etc.) to others. This information is often used to derive a score or metric reflecting how likely survey participants are to recommend the subject of the survey to others. One example of a recommendation metric that is commonly used in the market research industry is known as a Net Promoter® score or NPS® (Net Promoter, NPS, and Net Promoter Score are trademarks of Satmetrix Systems, Inc., Bain & Company, and Fred Reichheld). Typically, the survey actively solicits recommendation information from a participant by asking a question, like "How likely are you to recommend this brand to other people?" The participant is typically offered a scale from 0-10 in which to indicate his/her response. Thus, individual responses can range from 0 (not at all likely to recommend) to 10 (extremely likely to recommend). Responses falling into an upper range of the scale (e.g., responses of 9 and 10) may be referred to as "Promoter" responses, and responses falling into a lower range of the scale (e.g., responses of 0-6) may be referred to as "Detractor" responses. The scores received from a target audience of survey participants in response to the recommendation question may then be transformed into a grouped score that is computed as the percentage of responses falling into the upper range of the scale (e.g., Promoter responses) and then subtracting the percentage of responses falling into a lower range of the scale (e.g., Detractor responses).

The resulting metric or scores typically range from −100 to +100. A subject (e.g., brand, product, etc.) that gets perfect Promoter scores (e.g., all responses categorized as Promoter responses) receives a score of 100, and a subject that gets poor scores (e.g., all responses categorized as Detractor responses) ends up with a −100. So, a recommendation metric, such as the type computed in the above-described manner, may provide a single number that is often used in the market research industry to describe how likely survey participants are to recommend a given subject (e.g., brand, product, etc.).

BRIEF SUMMARY

While traditional surveys have involved active solicitation of information from survey participants, as discussed above, more recently approaches have been developed for evaluating unsolicited data gathered from the Internet. For instance, new online data collection approaches have been implemented, such as the exemplary approach disclosed in co-pending and commonly-assigned U.S. patent application publication no. 2011/0004483 titled "SYSTEMS FOR APPLYING QUANTITATIVE MARKETING RESEARCH PRINCIPLES TO QUALITATIVE INTERNET DATA" filed Jun. 7, 2010 (hereafter "the '483 publication"), the disclosure of which is hereby incorporated herein by reference. For instance, as described further in the '483 publication, in certain embodiments an exemplary system is provided which collects opinions from social media websites on the Internet such as Facebook®, Twitter®, Wordpress®, YouTube®, and Flickr®.

These new approaches focus on collecting opinions and information about products and services from websites, blogs, and/or other accessible data sources, which have essentially turned the Internet into a product database containing all possible points of view about every person, product, service, and brand that exists. In this way, rather than depending solely on information that is actively solicited from survey participants, unsolicited information pertaining to persons opinions and views regarding a particular subject (e.g., product, brand, etc.) that resides on the Internet (e.g., on social media sites, etc.) can be gathered and evaluated. Today, marketing researchers are taking advantage of this readily available information, and analyzing and packaging it in a format usable to survey subjects (e.g., brands, products, etc.) sometimes to complement, and sometimes to replace traditional survey data.

In accordance with embodiments of the present invention, various types of market research metrics may be derived reflecting the knowledge (e.g., awareness, opinions, etc.) of the audience from which data is gathered about the subject of the survey (e.g., a given brand, product, etc.). For instance, just as various metrics may be derived from the results of traditional surveys (i.e., using the information that is solicited from the survey participants), similar types of metrics may be derived (or "replicated") using unsolicited information gathered from the Internet, as discussed further herein. Examples of such market research metrics pertaining to or reflecting the knowledge of the audience about the subject, or so-called "knowledge metrics," that may be derived include without limitation awareness metrics, recommendation metrics, advocacy metrics, connection metrics, brand equity metrics, perceived value metrics, etc. Certain knowledge metrics may reflect the audience's familiarity with the subject, such as the audience's awareness of a given brand or product (e.g., as may be reflected by an awareness metric), and other knowledge metrics may reflect the audience's views, perceptions or opinions about the subject, such as the recommendation metrics, advocacy metrics, perceived value metrics, etc.

As one example, one of the most important measures within the traditional market research space is the recommendation measure which generally indicates how likely people are to recommend a subject (e.g., brand, product, etc.) to other people, whether friends, family, colleagues, or other people. Unfortunately, existing recommendation metrics are not measured through use of traditional surveys as frequently as is desired or recommended, they are costly to conduct, and they use only results from traditional, solicited survey data that is gathered from persons who agree to actively participate in such traditional survey. In addition, the recommendation data received from participants in traditional surveys reflects the participants' responses to the question of how likely they would be to recommend the subject to others, which does not necessarily reflect whether the participant actually makes any such recommendation to others (e.g., a participant in a traditional survey might indicate that they are highly likely to recommend the subject to others, but may never actually make any such recommendation).

In accordance with certain embodiments of the present invention, a recommendation measure/metric can be derived from qualitative Internet data, such as unsolicited opinion data gathered about a subject from the Internet. Such unsolicited opinion data may be gathered from the Internet by a system and in the manner disclosed in the '483 publication, as one example. For instance, recommendation behavior may occur within the Internet social media space where people can write status updates, tweets, or write blogs which recommend products and services to their friends, family, colleagues, and unknown people such as followers or readers. Further, a system designed around gathering such unsolicited opinion data from the Internet (e.g., from social media sites) has few timing or speed limitations, is less costly to conduct, and it uses data from the Internet which potentially reflects the opinions of millions of people rather than hundreds of people (whereas traditional surveys more commonly have participants numbered in the hundreds, rather than millions). Further, as it pertains to recommendation information, the opinion data gathered from the Internet in this manner may be more instructional, useful or powerful in that it often reflects actual recommendations (e.g., promotions or detractions) that are being made by persons (e.g., on social media sites, etc.), rather than merely asking the persons to state how likely they would be to make such a recommendation (as in traditional surveys).

Of course, while many illustrative examples provided herein focus on deriving a recommendation metric, other types of market research metrics reflecting the knowledge of the audience about a target subject may likewise be derived in accordance with the concepts disclosed herein. For instance, awareness, advocacy, connection, brand equity metrics, perceived value metrics, and various other types of knowledge metrics may be similarly derived from unsolicited data gathered from the Internet about a target subject. Indeed, by employing techniques similar to the exemplary techniques discussed herein for deriving recommendation metrics, one may likewise effectively replicate many types of knowledge metrics (e.g., recommendation metrics, awareness metrics, etc.) that are commonly derived for traditional surveys from unsolicited data gathered from the Internet about a target subject. For instance, certain embodiments may effectively replicate the NPS metric by deriving, from unsolicited opinion data gathered from the Internet, a recommendation score similar to that traditionally provided by the NPS score for traditional surveys. As another example, certain embodiments may effectively replicate the Engager™ tool available from Hall & Partners, by deriving, from unsolicited opinion data gathered from the Internet, a brand equity metric or score similar to that traditionally provided by the Engager™ tool for traditional surveys for indicating a link between a brand's index score or engagement and its profitability or value. As still another example, certain embodiments may effectively replicate the Net Value Score (NVS) developed by B2B International, by deriving, from unsolicited opinion data gathered from the Internet, a perceived value metric or score similar to that traditionally provided by the NVS for traditional surveys for indicating the market's view on the perceived value offered by one or more companies/brands supplying a market.

Thus, the present invention is directed generally to a system and method for generating one or more knowledge metrics (e.g., recommendation metrics, awareness metrics, advocacy metrics, connection metrics, etc.) using qualitative Internet data. For instance, unsolicited opinion data gathered from the Internet (e.g., from social media sites, etc.), such as in the exemplary system of the '483 publication, is processed by a system to generate one or more knowledge metrics, such as a recommendation metric, about a given subject (e.g., brand, product, etc.).

The data that is gathered from the Internet for use in generating a knowledge metric in accordance with certain embodiments is referred to herein as "unsolicited opinion data." It should be understood that this refers to the fact that the opinion data gathered from the Internet is not being solicited for a survey by the market researcher who is gathering the data. Of course, the opinion data that is gathered from the Internet may have been solicited in other contexts in some instances. For instance, a blogger may be asked by his/her readers to review certain products or to comment on a certain topic, and in response to such "solicitation" or request by his/her readers, the blogger may write/blog information giving his opinion about the subject matter. The opinion data from the blog may be gathered from the Internet in accordance with embodiments of the present invention, and may be used (along with other opinion data gathered from the Internet) in forming/deriving certain knowledge metrics about the subject matter, such as a recommendation metric, in accordance with certain embodiments of the present invention. It will be appreciated that the opinion data from the blogger in the above example is not solicited by the market researcher for the purposes of conducting the survey (to obtain the survey results), and is therefore referred to herein as unsolicited opinion data, even though it may have been solicited in some other context (e.g., by readers of the blog) as discussed above. In other words, from the viewpoint of the market researcher conducting the survey/research, the data gathered from the Internet is considered to be "unsolicited opinion data" because it was not solicited for purposes of conducting the desired survey/research.

Accordingly, in certain embodiments, an approach such as the exemplary approach disclosed in the '483 application is employed to enable market researchers to effectively replace or supplement active questioning of target audiences about subjects (for gathering survey response data) to "listening" to the data that people freely provide on the Internet about subjects. For instance, a process may be employed to crawl the Internet and gather opinion data about subject(s) that is published on the Internet by persons. The data gathered from the Internet may be analyzed and processed in an intelligent manner so as to effectively derive or generate desired survey response data (e.g., knowledge metrics) from it without requiring the persons who provided such data to actively participate in a survey.

As one illustrative example for deriving one type of knowledge metric, certain embodiments of an exemplary system are described further herein for building a recommendation metric (e.g., which may be a score similar to a score provided by a conventional NPS® score) using unsolicited opinion data gathered from the Internet (e.g., social media data). In certain embodiments, the approach for building the recommendation measure leverages (e.g., is implemented within) the exemplary system as disclosed in the '483 publication. Of course, embodiments of the present invention are not limited in use, application, or system architecture to the exemplary system or methods disclosed in the '483 publication. Instead, the systems and methods disclosed therein provide one illustrative platform which certain embodiments of the present invention may leverage in the manner described further herein. Additionally, embodiments of the present invention are not limited or restricted solely to use in deriving a recommendation metric, but instead or in addition other types of market research metrics reflecting the knowledge of the Internet "audience" about a target subject (e.g., so-called knowledge metrics) may be similarly derived consistent with the concepts, approaches, and techniques disclosed further herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 8 illustrates features of an exemplary cleaning step where data is processed to eliminate spam, redundant data, and the like.

FIG. 10 illustrates features of an exemplary scoring step where data may be scored according to a scale and the like.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Components of exemplary embodiments of the invention and relevant interfaces are described below. It is understood that various other implementations and component configurations are suitable. The following is for representative, non-limiting, illustrative purposes.

Figure 1:
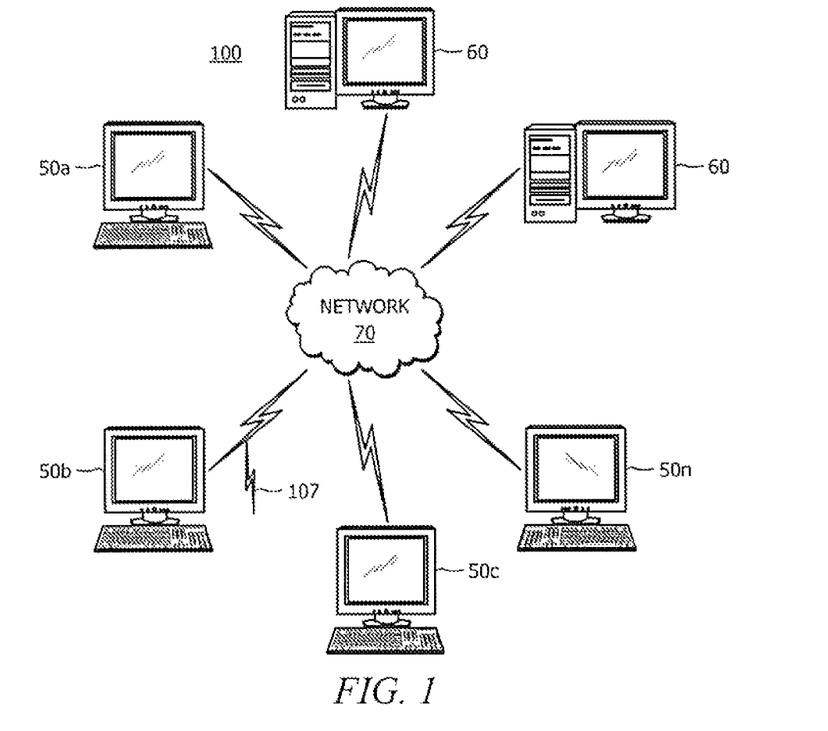
FIG. 1 illustrates a computer network or similar digital processing environment in which exemplary embodiments of the present invention may be implemented.
Figure 2:
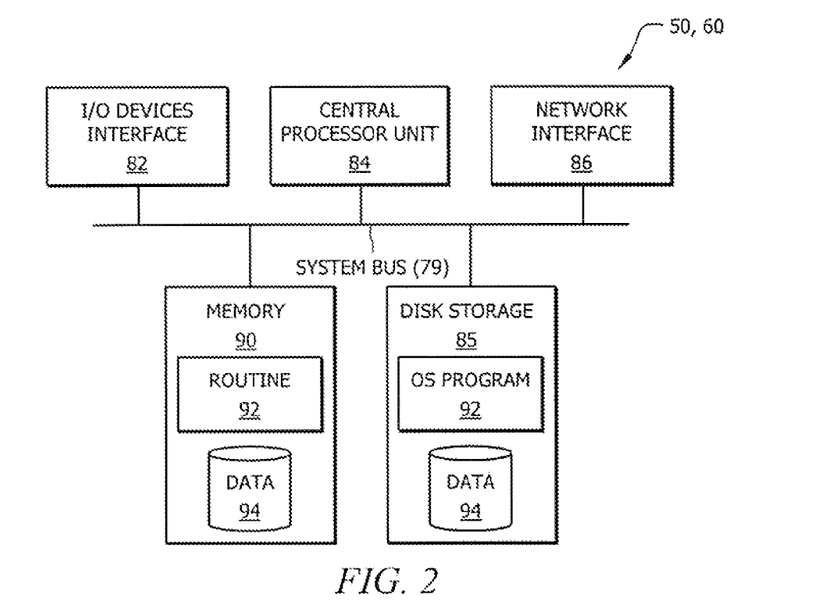
FIG. 2 is a diagram of an exemplary internal structure that may be implemented for a computer in the computer system of FIG. 1.
Figure 3:
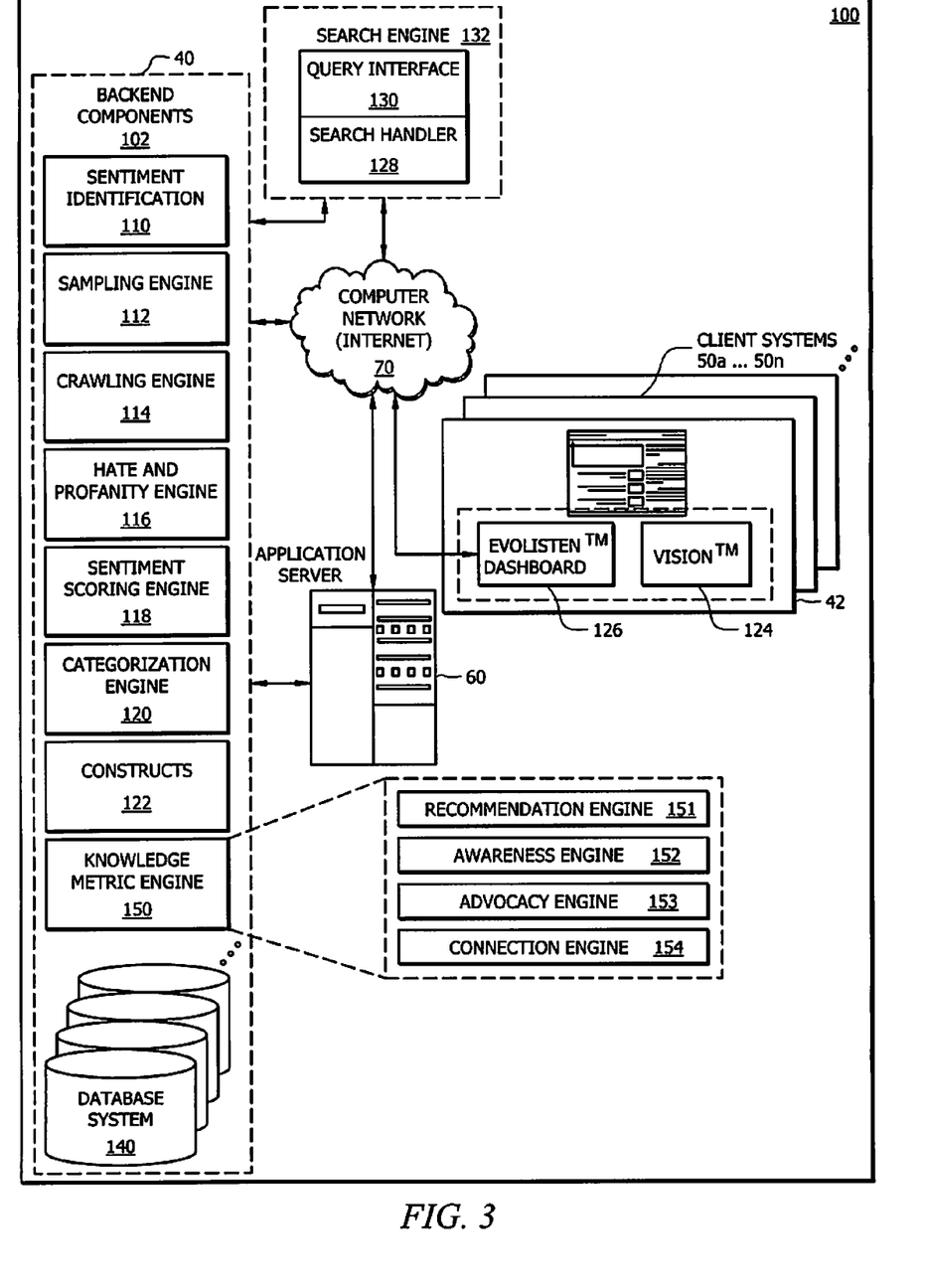
FIG. 3 is a diagram of a system architecture for one exemplary embodiment of the present invention.

Preferably, embodiments of the present invention are implemented in a computer software and/or hardware environment. FIGS. 1-3 show an exemplary system in which certain embodiments of the present invention may be deployed. While the exemplary system shown and described with FIGS. 1-3 provides one illustrative platform/system on which embodiments of the present invention may be implemented, it should be understood that embodiments of the present invention are not limited in scope to any specific platform or computer architecture. Certain embodiments of the present invention may be implemented on a computer platform/system leveraging the EvoListen™ solution that is commercially available from Conversition Strategies Limited, an e-Rewards, Inc. business unit. However, embodiments of the present invention are not limited in scope to any specific platform or computer architecture or to application with the specific EvoListen™ solution, but may instead the concepts disclosed herein may be employed on various types of computer platforms/systems and employ any number of data gathering and analysis techniques.

In the exemplary system 100 of FIG. 1, client computer(s)/devices 50 a, b, . . . , n (50 generally) and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth®, etc.) to communicate with one another. Other electronic device/computer network architectures are suitable.

Continuing from FIG. 1, FIG. 2 is a diagram of an exemplary internal structure that may be implemented for a computer (e.g., client processor/device 50 or server computers 60) in the computer system 100 of FIG. 1. In this example, each computer 50, 60 contains system bus 79, generally having a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 1). Memory 90 provides volatile storage for computer software instructions 92 (e.g., operating system instructions, software application and/or other instructions as may be implemented for performing the operations described further herein) and data 94 used to implement an embodiment 100 of the present invention. Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the software instructions/routines (such as the software instructions for performing various operations described further herein) and/or data 94 are implemented as a computer program product (generally referenced as computer program product 92), including a computer-readable medium (e.g., a fixed or removable storage medium such as one or more DVD-ROM's, CD-ROM's, diskettes, tapes, etc.) that provides at least a portion of the software instructions for an exemplary embodiment of the present invention. The computer program product 92 can be installed by any suitable software installation procedure, as is well known in the art. In another embodiment, at least a portion of the software instructions may also be downloaded over a cable, communication and/or wireless connection.

As mentioned in the '483 publication, all or a portion of the software instructions and/or data (e.g., data gathered from the network 70) may be communicated (e.g., across network 70 and/or within a given computer device) as signals propagating on a carrier or propagation medium. As used herein, a computer-readable storage medium refers to a tangible storage medium, such as a hard disk, ROM, RAM, flash memory device, magnetic memory device, and is not intended to refer merely to a propagating signal. As described further herein, various elements shown further in the example of FIG. 3, such as search engine 132, client front end 42, and backend components 102 may be implemented as computer-executable software instructions (or applications) that are stored to a computer-readable storage medium (e.g., hard disk, ROM, RAM, flash memory device, magnetic memory device, etc.) that when executing on a processor-based device (e.g., client computer system 50 or application server system 60) performs the corresponding operations described herein.

Continuing with FIG. 3, one exemplary embodiment of system 100 that may be implemented in shown. As shown in this example, system 100 may include various backend components 102 including a sentiment identification engine 110, sampling engine 112, crawling engine 114, hate and profanity engine 116, sentiment scoring engine 118, categorization engine 120, construct engine 122, and database system 140, which may be implemented on application server 60.

An exemplary implementation of the client front end 42 of the system 100 uses a web-based interface having two major components. The first component is an engine interface (e.g., the EvoListen Vision™ interface commercially available from Conversition Strategies Limited, an e-Rewards, Inc. business unit) 124, which provides an interactive visualization of data enabling users to type in specific subjects (e.g., brands) to view conversations generated online from various websites. The second component is an interactive sentiment modeler (e.g., the EvoListen Dashboard™ commercially available from Conversition Strategies Limited, an e-Rewards, Inc. business unit) 126, which permits viewing of a quantified analysis and summary of positive and negative sentiments regarding a specific brand as sampled from the Internet. While shown as implemented on client system 50 in this example, the client front end components 42 may, in certain embodiments, be hosted by the application server 60.

An exemplary implementation and operational functionality of various components shown in FIG. 3 are described further in the '483 publication. In accordance with an exemplary embodiment of the present invention, a knowledge metric engine 150 is further included in the system of FIG. 3, which is described further herein. As described further herein, the knowledge metric engine 150 processes the opinion data gathered (e.g., by crawling engine 114) to generate/derive one or more knowledge metrics, such as recommendation metric, awareness metric, advocacy metric, or connection metric, as examples, for a target subject (e.g., a specific brand, product, etc.). Thus, in this exemplary embodiment, knowledge metric engine 150 may include one or more of recommendation engine 151, awareness engine 152, advocacy engine 153, and connection engine 154 for generating recommendation metrics, awareness metrics, advocacy metrics, and connection metrics, respectively. Of course, other engines for processing the gathered opinion data for deriving any other type of knowledge metric in addition to or instead of those shown in the example of FIG. 3 may be included in other embodiments of the present invention.

Figure 4:
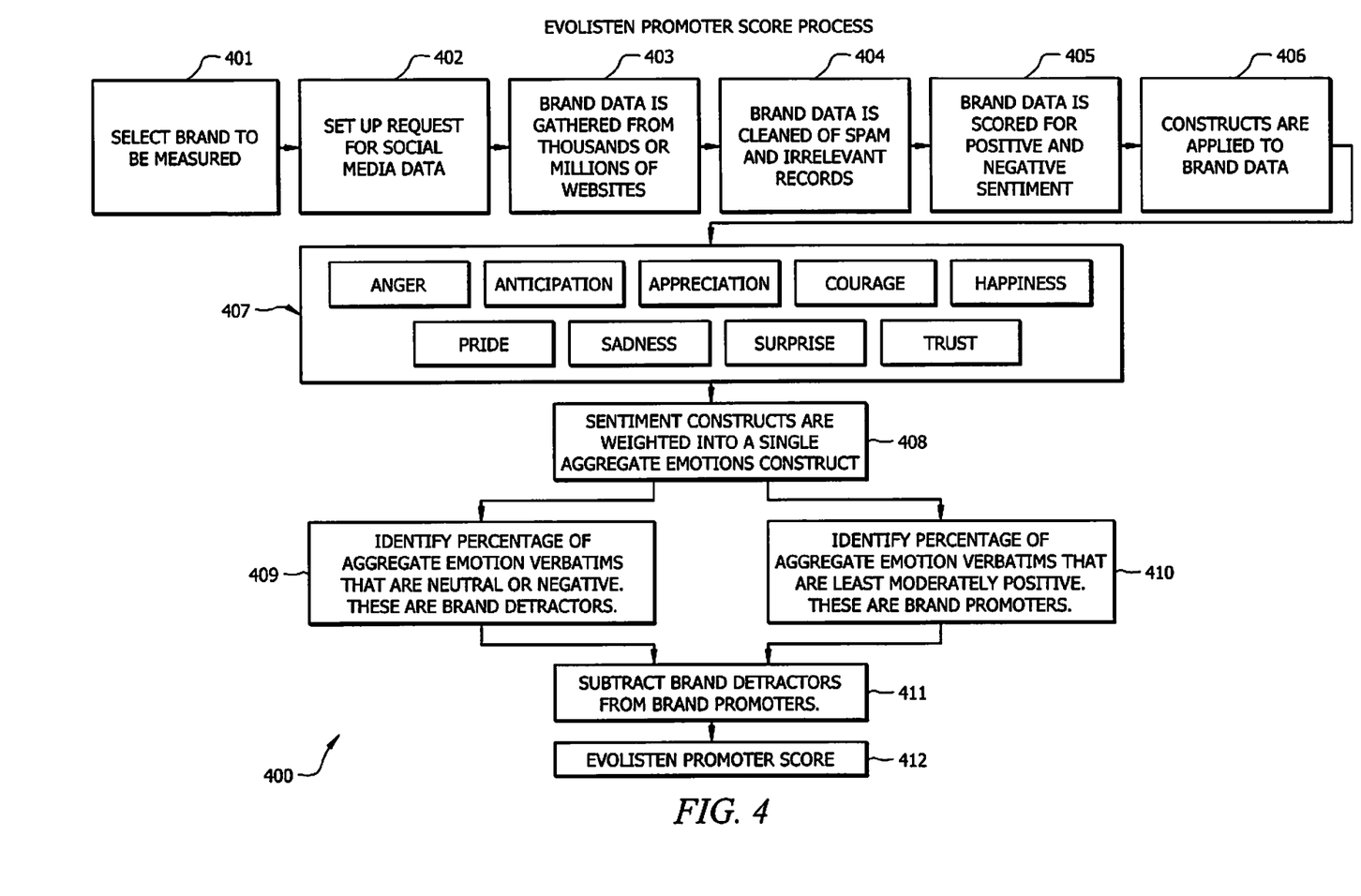
FIG. 4 is a diagram of an exemplary process for generating knowledge metric, such as a recommendation metric, in accordance with one embodiment of the present invention.

As described further herein, the recommendation engine 151 processes the opinion data gathered (e.g., by crawling engine 114) to generate/derive a recommendation metric or score, for a target subject (e.g., a specific brand, product, etc.). Turning to FIG. 4, an exemplary operational process for generating a recommendation metric in accordance with one embodiment is shown. In operational block 401, the system accepts a request for recommendation data about a specified target subject (e.g., target brand, product, etc.) from a user (e.g., a user of client system 50). This request is usually in the form of a brand name or a company name.

The system accepts the request and proceeds to send out Internet crawlers (by crawling engine 114) which gather publicly available data from across the Internet. This data may come from social networks, video sites, photo sites, blogging sites, forums, question and answer sites, news sites, or many other types of websites. Accordingly, as shown in operational block 402, the request for opinion data (e.g., available on social media sites, etc.) relating to the target subject is setup, and in block 403 opinion data about the target subject is gathered from the Internet by crawling engine 114, which may gather such data from thousands or millions of sites on the Internet.

In operational block 404, the information is run through a data cleaning process. This process removes undesirable data such as spam and irrelevant information. For instance, a record that was intended to gather data about Tide® laundry detergent will be cleaned of mentions of ocean tides.

In operational block 405, the remaining gathered records are processed by sentiment scoring engine 118 to compute a score reflecting the sentiment of the records about the target subject. In one embodiment, this process identifies which records have a positive or negative tone of voice and a number may be assigned to each message on a continuous scale. In one exemplary embodiment, sentiment scores can range anywhere between −1 and +1 including all of the decimal places in between (e.g., −1, −0.28, 0, 0.67, 1.0).

In operational block 406, constructs are applied to the records. That is, construct engine 122 processes the records. As described in further detail in the '483 publication, the construct engine 122 may be analogous to the qualitative method of content analysis. The construct engine 122 may be an automated engine that applies rules to sort and organize sentiments into meaningful, taxonomic units of data. It creates an objective, systematic, quantified description of the content of the written communications. As also discussed in the '483 publication, the system may include over 1,000 carefully developed, unique constructs that reflect the most important measurements within marketing research as well as niche constructs reflecting specific categories.

In accordance with embodiments of the present invention, certain ones of the constructs may be predetermined as relating to recommendation information. Thus, in operational block 407, the system identifies the specific records that are related to each of the constructs or variables that are predetermined for use in deriving the recommendation metric. In one exemplary embodiment, these variables used to build the recommendation metric algorithm include 1) Appreciation, 2) Anticipation, 3) Happiness, 4) Courage, 5) Trust, 6) Anger, 7) Sadness, 8) Pride, and 9) Surprise. Other variables may be included as desired and depending on the unique requirements of a given target subject being evaluated. For instance, any variable that is deemed as correlating well with the recommendation metric may be included in the set of variables used in operational block 407. Each of the variables may be carefully prepared/processed to ensure that records are not erroneously assigned. For instance, people who think a brand is being "courageous" may say the brand is "brave." However, messages about "Braves baseball" or the TV show "Brave and the Bold" should not erroneously place a message into the Courage variable.

Thus, the records containing variables relating to the recommendation metric are identified in operational block 407. For instance, some number of records, say 5,000 records, may be gathered by crawling the web, which are deemed as containing opinion data (or "sentiment data") about a target subject, and of those records, a sub-set that contain the variables relating to the recommendation metric may be identified in operational block 407.

Once all of the variables have been built from the social media data, they are then combined into an algorithm that appropriately weights the contribution of each variable terms into a single Aggregate Emotions construct, in operational block 408. For instance, more weight may be given to certain ones of the recommendation variables. For example, more weight may be given to the appreciation variable or to the anger variable than to the courage variable. The variables used in block 407 for identifying recommendation information may be weighted differently according to a predetermined relative importance or relative correlation of each variable with recommendations. In certain implementations, one may choose to weight them all equally, or the variables may be weighted differently depending how one pre judges their relative importance or correlation to recommendation information.

In operational block 409, the percentage of Aggregate Emotions verbatims for a particular set of data that fall into the range of neutral or negative are identified to determine the percentage of verbatims that are "detractors," and in operational block 410 the percentage of Aggregate Emotions verbatim for the particular data set that fall into the range of moderately high to very high positive are identified to determine the percentage of verbatims that are "promoters." In this exemplary embodiment, the records that score in between these two extremes are not used in the calculation (between neutral and moderately high positive).

In operational block 411, the detractor score (determined in block 409) is subtracted from the promoter score (determined in block 410) to compute the EvoListen™ recommendation score, which is output in operational block 412. The EvoListen™ recommendation score in this exemplary embodiment, is the final outcome that clients can use to determine how consumers view their target subject (e.g., brand) in relation to other subjects (e.g., in relation to other brands). In this exemplary embodiment, EvoListen™ recommendation score can range from −100 to +100. For example, brands that generate verbatims that are 100% negative will produce a promoter score of 0 and a detractor score of 100. This gives an EvoListen™ recommendation score of −100. On the other hand, a brand might generate 50% of verbatims that are positive and just 10% that are negative; and thus the EvoListen™ recommendation score for this brand according to this exemplary embodiment would be 50-10=40.

Figure 5:
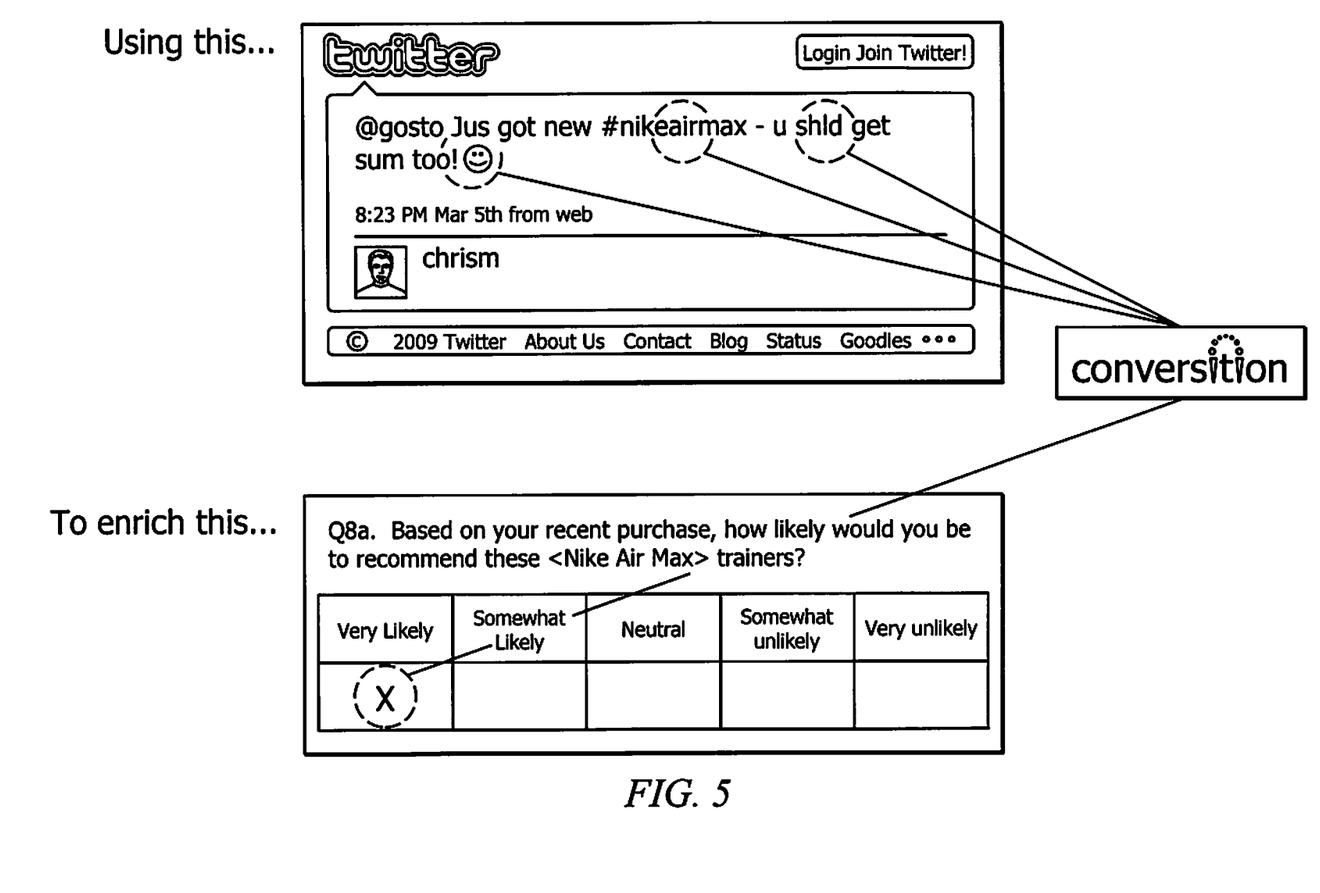
FIG. 5 provides one exemplary conceptual-level illustration of how certain embodiments of the present invention may effectively translate unsolicited opinion data gathered from the Internet into a corresponding recommendation metric.
Figure 6:
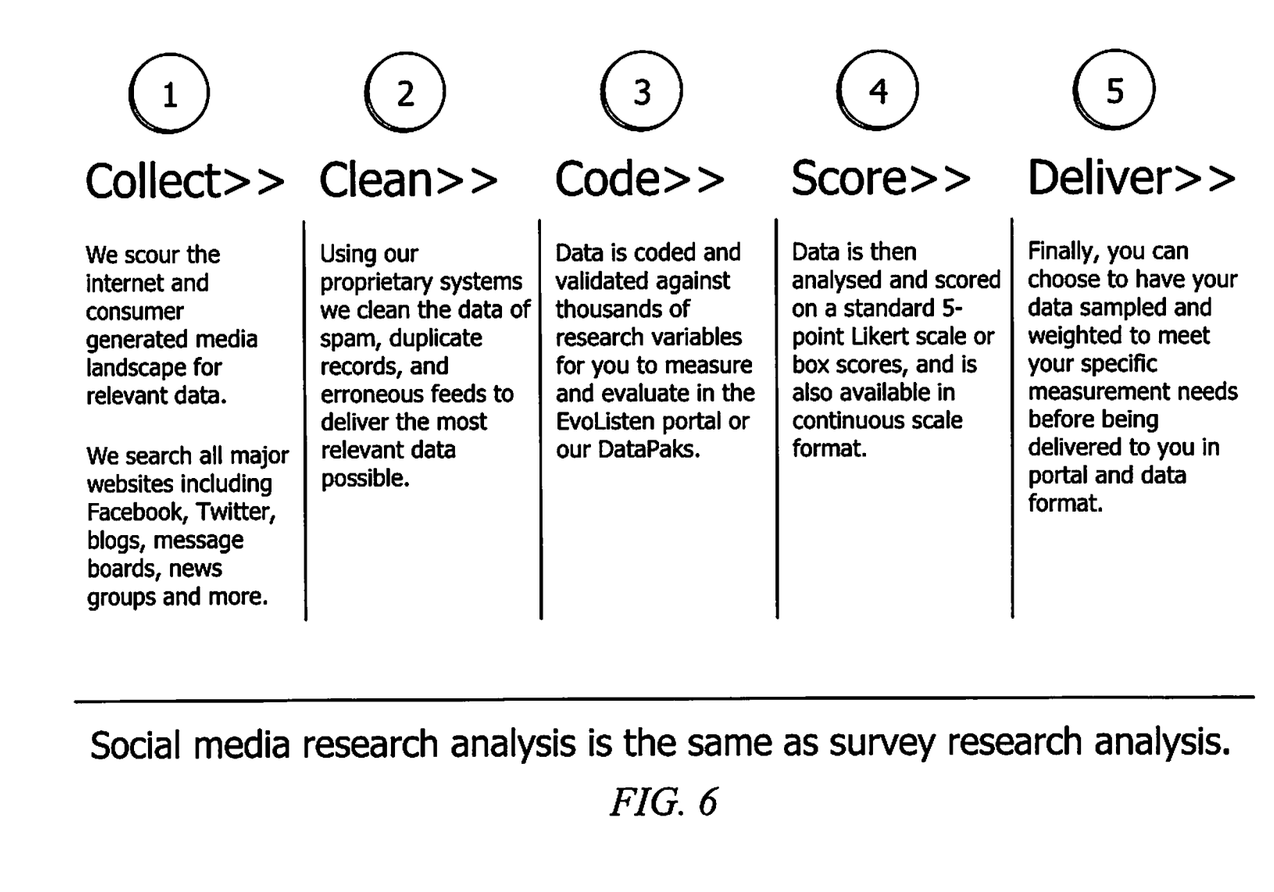
FIG. 6 shows an exemplary operational flow in accordance with one embodiment of the present invention.
Figure 7:
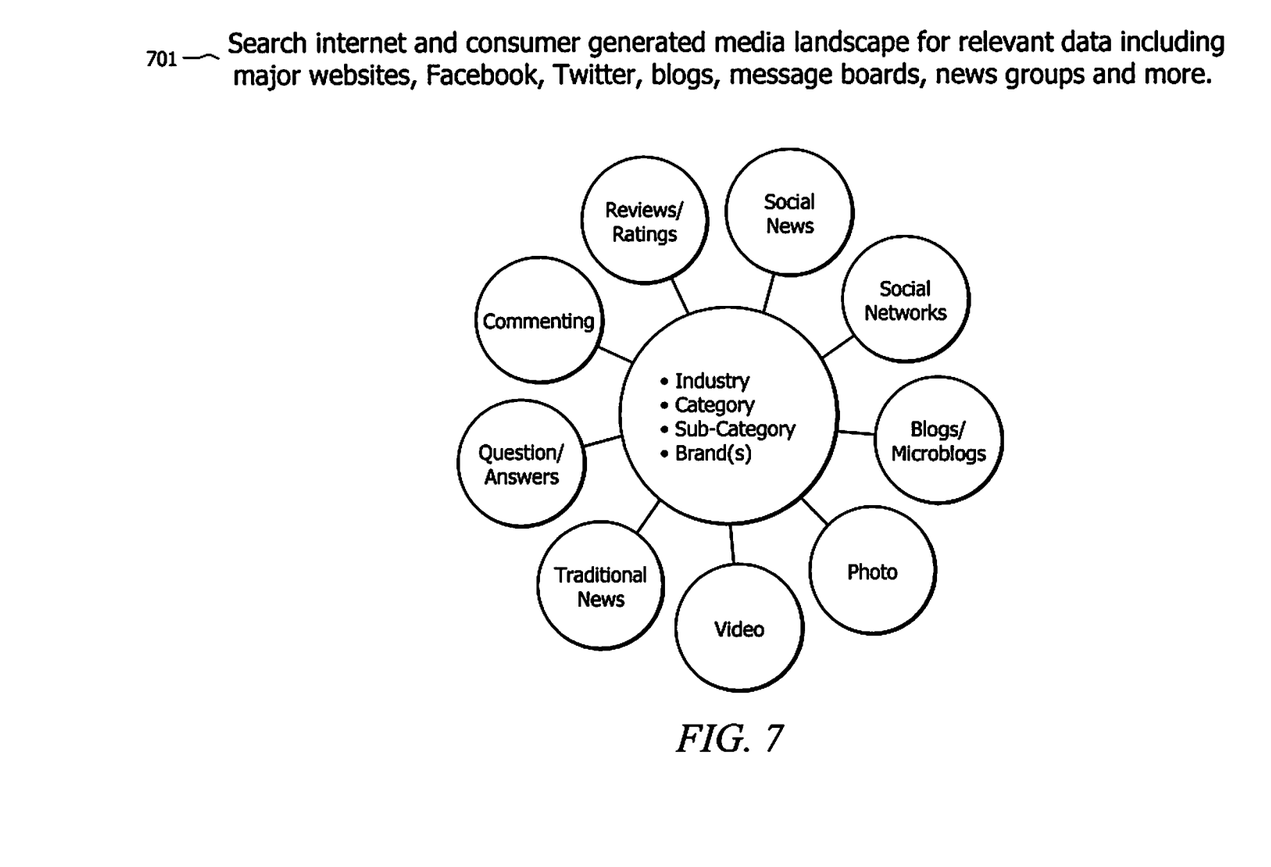
FIG. 7 illustrates features of an exemplary collection step where information is collected according to a refinement process.

Reference is now made to FIGS. 5-11 which illustrate additional details of the inventive concepts described herein. For example, FIG. 5 provides one exemplary conceptual-level illustration of how certain embodiments of the present invention may effectively translate unsolicited opinion data gathered from the Internet, such as the exemplary Twitter® feed shown, into a corresponding recommendation metric, like "Very Likely" to recommend the subject matter (Nike® Air Max trainers in this example) to others. FIG. 6 shows an exemplary operational flow in accordance with one embodiment of the present invention, which includes the operational steps (labeled 1-5 in FIG. 6) of collecting unsolicited opinion data from the Internet, cleaning the collected data for improving relevance to a target subject, coding the data against research variables, scoring the data, and delivering/reporting the results. FIGS. 7-11 illustrate further details of the operational steps of FIG. 6 according to one exemplary embodiment of the present invention. For example, FIG. 7 illustrates features of an exemplary collection step 701 where information is collected according to a refinement process by identifying "industry," "category," "subcategories," and "brand(s)."

Figure 8:
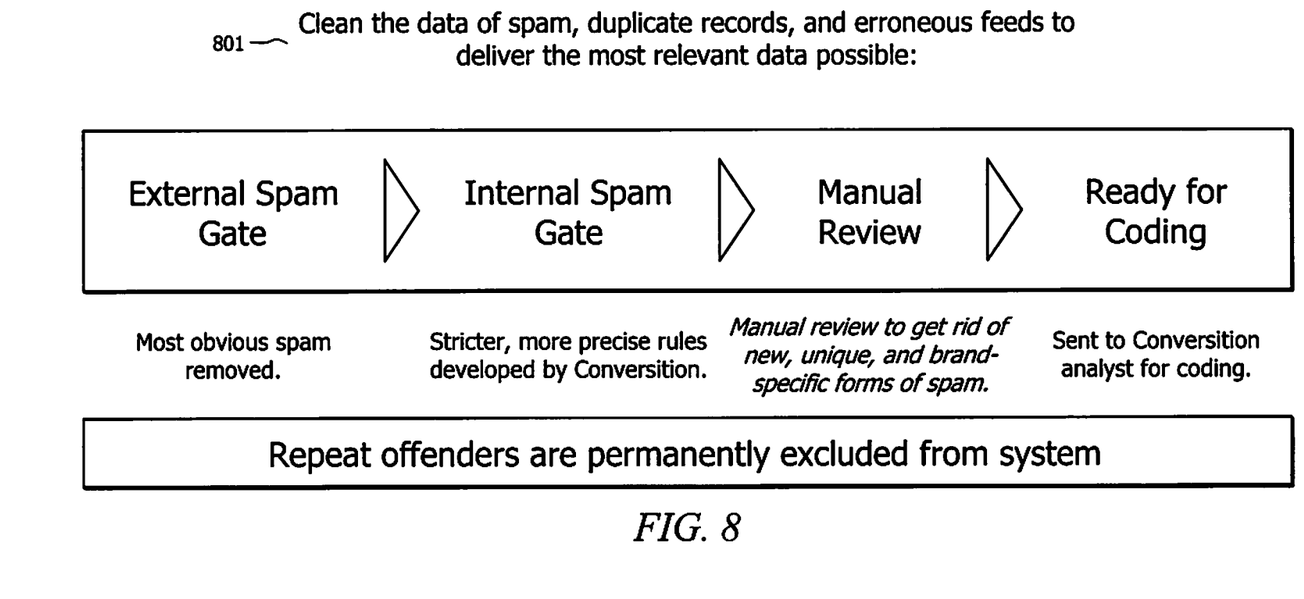

FIG. 8 illustrates features of an exemplary cleaning step 801 where data is processed to eliminate spam, redundant data, and the like. As seen, step 801 involves a refinement, applying stricter rules incrementally to obtain the best set of data.

Figure 9:
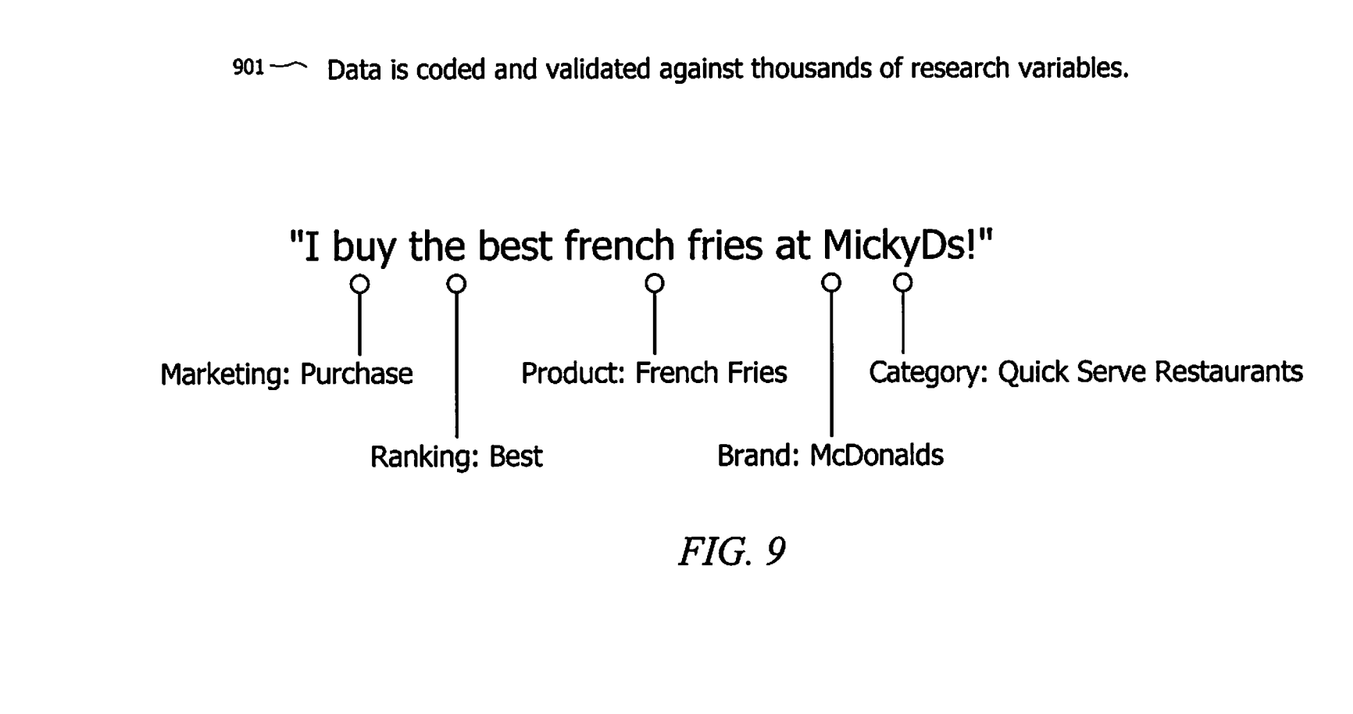
FIG. 9 illustrates features of an exemplary coding step where the processed data is coded and validated against research variables.

FIG. 9 illustrates features of an exemplary coding step 901 where the processed data is coded and validated against research variables. As part of step 901, data is validated against several types of pre-validated constructs or variables. Such variables may include, e.g.:

- emotions including: anger, anticipation, fear, sadness and happiness;
- traditional market research variables including: purchasing, trial, recommendation, new and different;
- marketing variables including: product, placement, pricing and promotion. Promotion variables including coupons, advertisements, and product placement;
- retailer variables including: crowding, parking lots, opening hours and employees. Food variables including spiciness, calories, fat-free and sodium;
- financial variables including: ATMs, interest rates and GICs; and
- additional categories including: gaming, electronics, entertainment, education, athletics and more.

According to the illustrated example, the sentence, "I buy the best french fries at MickyDs!" covers a range of variables including purchasing, the product french fries, the quick serve restaurant category, the brand McDonalds®, and a ranking of best.

Figure 10:
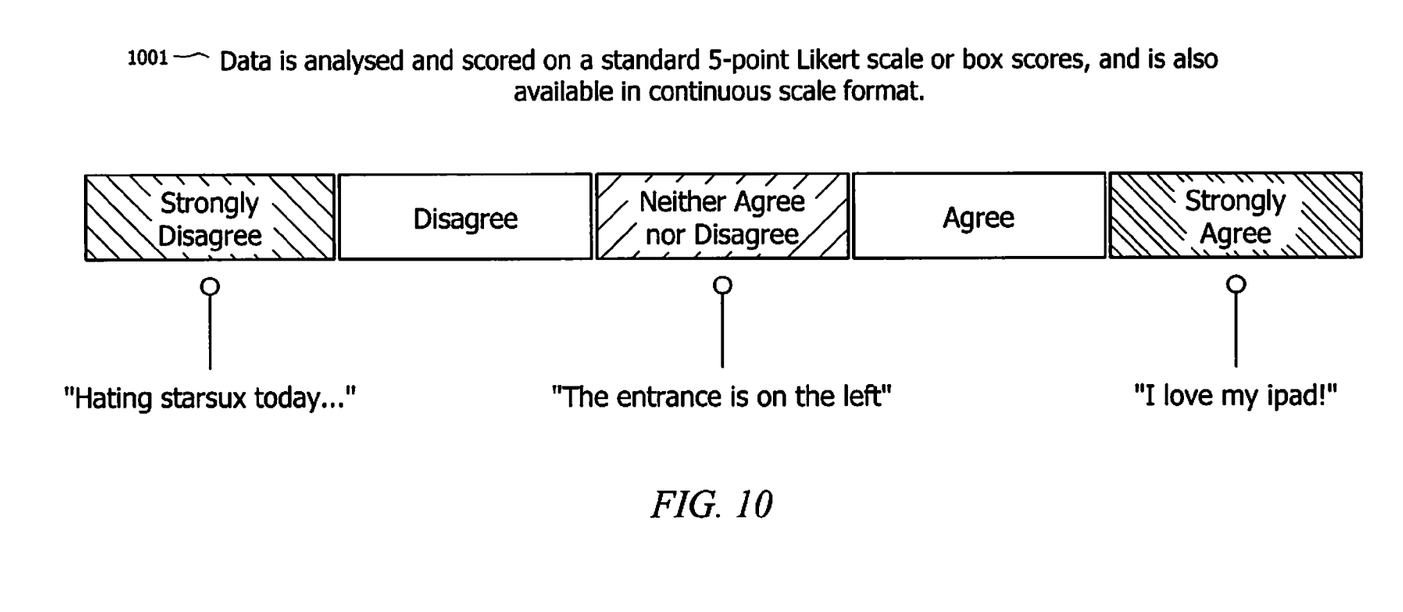

FIG. 10 illustrates features of an exemplary scoring step 1001, where data may be scored according to a scale and the like. Step 1001 may involve conducting a series of validity tests to enable a system that generates the most accurate results across a wide range of data types. According to a preferred embodiment, the system properly codes 1) grammatically correct messages as used in blogs and other formal websites, and 2) data from Twitter®, Facebook®, and other websites where casual language ignores grammatical conventions and where slang and emoticons are widespread. The system further scores both short pieces of text as well as longer essay style pieces of text. As seen from the illustrated example, the system further assigns valid continuous scores to verbatims that contain slang, emoticons, grammatically correct and incorrect phrasing, e.g., ""Hating starsux today . . . ," "The entrance is on the left," and "I love my ipad!"

Figure 11:
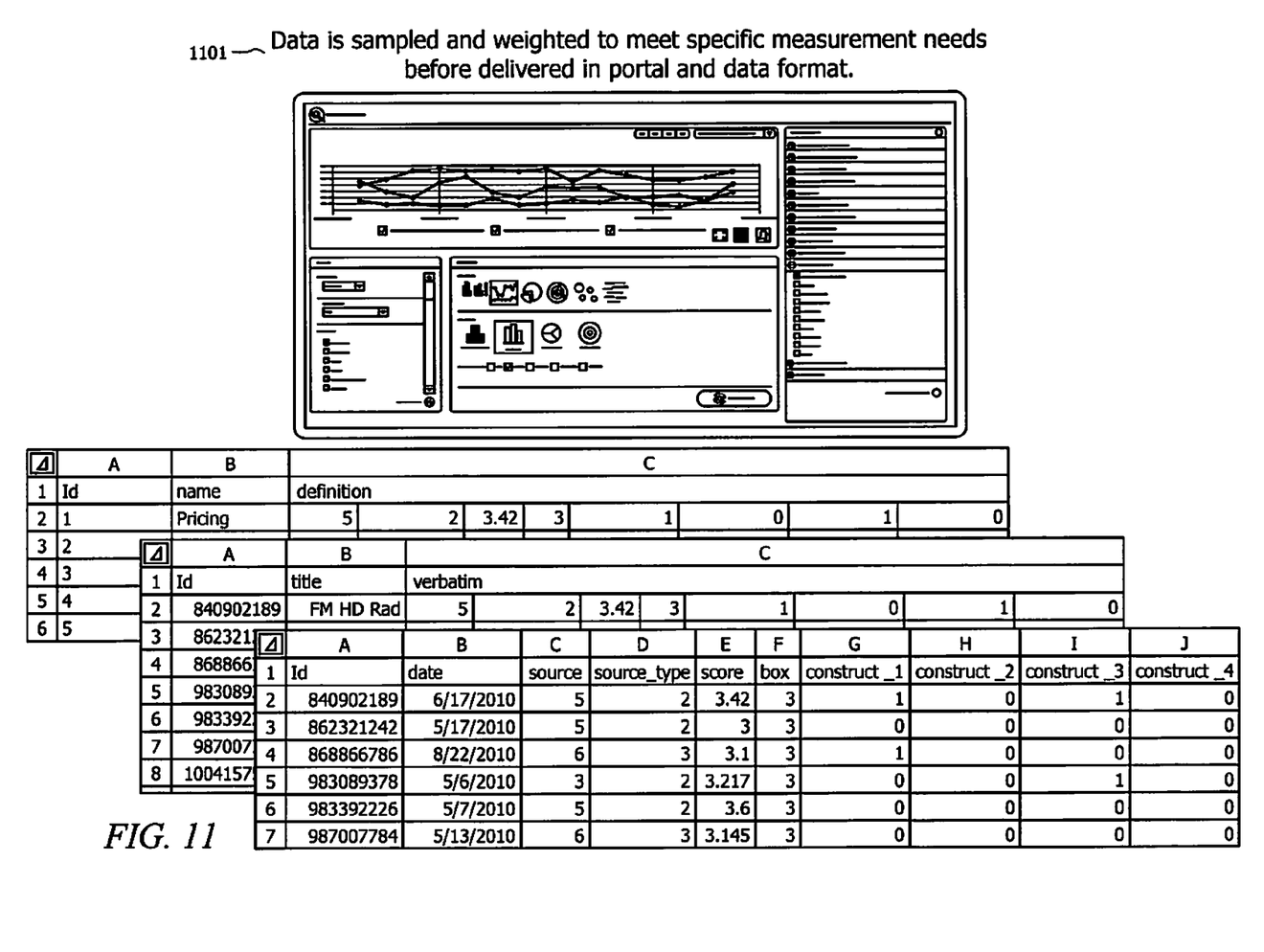
FIG. 11 illustrates features of an exemplary delivery step where data may be sampled and weighted to meet a user's specific measurement needs before being delivered to the user in portal and data format.

FIG. 11 illustrates features of an exemplary delivery step 1101, where data may be sampled and weighted to meet a user's specific measurement needs before being delivered to the user in portal and data format. Generating recommendation information (e.g., recommendation metric) in accordance with certain embodiments of the present invention may provide any number of advantages or benefits over (or for use with) traditional surveys. Some of the advantages that may be recognized in certain embodiments are discussed hereafter.

Timeliness. Through the use of traditional surveys, competitive measures are traditionally conducted regularly but infrequently, perhaps monthly or quarterly. Through use of certain embodiments of the present invention, this measurement can be conducted in both frequent and timely manners. The measure may be conducted on a regular monthly, weekly, or daily basis as desired. In addition, the measure can be conducted at as soon as it is desired. This is because in certain embodiments the base system on which the measure is hosted may collect data and calculate the measure on a live basis. For instance, data may be collected on a 24 hour, 7 day a week basis.

Traditional survey solutions do not meet the speed desires commonly present in the market research industry. In general, the measures are unavailable until the next regularly scheduled survey is conducted. This may be weeks or months away. Even when ad hoc surveys are conducted, data is not normally available for at least several days. This is a potentially serious problem when products have only been on the market a short time or when positive (e.g., consumer awards) or negative (e.g., product recalls or safety incidents) events occur for a brand. Certain embodiments of the present invention allow recommendation measures to be calculated as desired/needed, even as soon as, say 6 hours, after deciding that a research result is desired by a client.

Sample sizes. Measures based on traditional survey systems are highly restricted in terms of how many people respond to them due to various reasons, such as costs to identify and incentivize people to participate. This means that most measures focus only on responses from several hundred participants. Certain embodiments of the approach described herein has no such limitation as opinions are gathered from the Internet, a source which serves as host for millions of opinions about millions of subjects. Consequently, sample sizes are significantly larger, often twenty times or more, than that commonly achieved through traditional surveys.

Representation. Traditional survey systems must currently gather opinions first from people whom they are able to individually contact and second from people who agree to answer the survey and then follow through to complete it. This can produce results which are unable to reflect the opinions of large groups of people who either cannot be identified for surveying purposes or who are unable to complete the survey. Certain embodiments of the present invention gathers opinions from people without requiring that their contact information be gathered first. And, opinions may be gathered from people who may not necessarily actively participate or answer surveys. As such, certain embodiments may gather opinions from a much wider group of people than are normally available to traditional survey research.

Cost savings. The relative costs of gathering and measuring opinions is much less for certain embodiments of the present invention compared to that commonly incurred for traditional survey methods. Because of these cost savings, far more subjects (e.g., brands) may be measured based on much larger sample sizes (and/or much more often) with less expense.

While the illustrative example of FIG. 4 describes one technique for deriving a recommendation metric (e.g., by recommendation engine 151), other types of knowledge metrics may be similarly derived using unsolicited data gathered from the Internet. As one example, by selecting the appropriate variables (e.g., as in operational block 407) that relate to a given metric (e.g., to awareness, advocacy, etc.) and by selecting a desired weighting to be employed (e.g., in operational block 408) for those variables, one may derive a similar technique for selecting records to be processed for computing various other types of knowledge metrics. Of course, other approaches for processing the gathered unsolicited Internet data to replicate or derive various types of knowledge metrics, such as various market research metrics commonly derived from traditional survey data, will be appreciated by those of ordinary skill in the art, and any such approaches are within the scope of the present invention.

Various elements of embodiments of the present invention, such as backend components 102 (including knowledge metric engine 150, as well as the recommendation engine 151, awareness engine 152, advocacy engine 153, and connection engine 154), client front end 42, and/or search engine 132 may be implemented as computer-executable software instructions/applications stored to a computer-readable storage medium (e.g., hard disk, ROM, RAM, flash memory device, magnetic memory device, etc.) that when executing on a processor-based device (e.g., server system 60 or client system 50) provides the corresponding functionality described herein for such element.

Many of the elements described herein, when implemented via computer-executable instructions, are in essence the software code defining the operations thereof. For instance, the above-described backend components 102 (e.g., sentiment identification engine 110, sampling engine 112, crawling engine 114, hate and profanity engine 116, sentiment scoring engine 118, categorization engine 120, construct engine 122, and knowledge metric engine 150) each may comprise computer-executable software code that is stored to a computer-readable storage medium and is executed by a processor-based computing device (e.g., server device 60) for performing the corresponding operations described herein. Further, the various operations described herein, such as those operations described with reference to the exemplary flow of FIG. 4, as well as other operations described herein may be performed by computer-executable software code stored to a computer-readable storage medium and executing on a processor-based computing device. The executable instructions or software code may be obtained, for example, from a computer-readable storage medium or "storage device" (e.g., a hard drive media, optical media, EPROM, EEPROM, tape media, cartridge media, flash memory, ROM, memory stick, and/or the like). In certain embodiments, a CPU of a computing system or device may execute the various logical instructions according to embodiments of the present invention. For example, CPUs of server device(s) 60 and/or client devices 50 may execute machine-level instructions according to the exemplary operational flow described above in conjunction with FIG. 4. It shall be appreciated that the present invention is not limited to the architecture of the computing system or device on which the various elements are implemented, such as any particular architecture of a server device 60 or a client device 50. The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein, as examples. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for generating a knowledge metric about a target subject, the method comprising:
  gathering, by a data gathering engine, unsolicited opinion data about a target subject from a communication network;
  cleaning, by a computer system, the gathered data to remove data not relevant to the target subject to result in cleaned data; and
  processing, by at least one data processing engine, the gathered data to compute a recommendation metric reflecting a measure of recommendation opinions about the target subject, said processing comprising:
    identifying recommendation records;
    determining a percentage of aggregate emotions verbatims for the recommendation records that fall into a predetermined range of neutral or negative recommendation, thereby computing a detractor score;
    determining a percentage of aggregate emotions verbatims for the recommendation records that fall into a predetermined range of positive recommendation, thereby computing a promoter score; and
    subtracting the detractor score from the promoter score to compute the recommendation metric.

2. The method of claim 1 further comprising:
receiving, by a computer system, a request for recommendation information about the target subject.

3. The method of claim 1 wherein said gathering comprises:
deploying, by a crawling engine, Internet crawlers for gathering publicly available data from the Internet.

4. The method of claim 1 further comprising:
processing, by a sentiment scoring engine, the cleaned data to compute a score reflecting a sentiment of records contained in the cleaned data about the target subject.

5. The method of claim 1 further comprising:
weighting the predetermined recommendation variables based on their relative correlation to recommendation to compute aggregate emotion.

6. A system for generating a knowledge metric about a target subject, the system comprising:
a data gathering engine for gathering unsolicited opinion data about a target subject from a communication network;
a cleaning engine for cleaning the gathered data to remove data not relevant to the target subject to result in cleaned data; and
at least one data processing engine for processing the gathered data to compute a recommendation metric reflecting a measure of recommendation opinions about the target subject, said processing comprising:
identifying recommendation records;
determining a percentage of aggregate emotions verbatims for the recommendation records that fall into a predetermined range of neutral or negative recommendation, thereby computing a detractor score,
determining a percentage of aggregate emotions verbatims for the recommendation records that fall into a predetermined range of positive recommendation, thereby computing a promoter score; and
subtracting the detractor score from the promoter score to compute the recommendation metric.

7. The system of claim 6 further comprising:
a computer system for receiving a request for recommendation information about the target subject.

8. The system of claim 6 wherein said gathering comprises:
a crawling engine for deploying Internet crawlers for gathering publicly available data from the Internet.

9. The system of claim 8 further comprising:
a sentiment scoring engine for processing the cleaned data to compute a score reflecting a sentiment of records contained in the cleaned data about the target subject.

10. The system of claim 6 further comprising:
an engine for weighting the predetermined recommendation variables based on their relative correlation to recommendation to compute aggregate emotion.

* * * * *